(12) United States Patent
Sesselego (10) Patent No.: US 11,407,468 B2
(45) Date of Patent: Aug. 9, 2022

(54) MULTIFUNCTIONAL VEHICLE

(71) Applicants: Tomaso Sesselego, Capoterra (IT);
Alessio Sesselego, Capoterra (IT)

(72) Inventor: Tomaso Sesselego, Capoterra (IT)

( * ) Notice: Subject to any disclaimer, the term of this patent is extended or adjusted under 35 U.S.C. 154(b) by 21 days.

(21) Appl. No.: 17/257,007

(22) PCT Filed: Jul. 16, 2019

(86) PCT No.: PCT/EP2019/069135
§ 371 (c)(1),
(2) Date: Dec. 30, 2020

(87) PCT Pub. No.: WO2020/016236
PCT Pub. Date: Jan. 23, 2020

(65) Prior Publication Data
US 2021/0129934 A1    May 6, 2021

(30) Foreign Application Priority Data

Jul. 20, 2018  (IT) .......................... 102018000007362

(51) Int. Cl.
*B62K 13/00* (2006.01)
*B62K 5/01* (2013.01)

(52) U.S. Cl.
CPC ................ *B62K 13/00* (2013.01); *B62K 5/01* (2013.01)

(58) Field of Classification Search
CPC .............. B62K 13/00; B62K 5/01; B62K 5/08
See application file for complete search history.

(56) References Cited

U.S. PATENT DOCUMENTS 7,175,192 B1    2/2007  Ly
2010/0253035 A1  10/2010  Miroewski

FOREIGN PATENT DOCUMENTS

| CA | 2197501 A1 | 8/1998 | |
| CN | 104843122 B | 8/2017 | |
| CN | 107042858 A  * | 8/2017 | ............. B62K 13/00 |
| DE | 202006017459 U1 * | 8/2007 | ............. B62B 19/00 |
| JP | S6380292 U | 5/1988 | |
| JP | 2009083539 A | 4/2009 | |
| JP | 3210614 U  * | 6/2017 | ............. B62K 21/02 |
| WO | WO-2006072971 A1 * | 7/2006 | ........... B60G 21/007 |
| WO | 2014/080988 A1 | 5/2014 | |
| WO | WO-2017194686 A1 * | 11/2017 | ........... B60G 21/007 |

* cited by examiner

*Primary Examiner* — Drew J Brown
(74) *Attorney, Agent, or Firm* — David Guerra (57) ABSTRACT

A multifunctional vehicle including a chassis in which a longitudinal centerline plane is defined. A first pair of wheels is connected to the chassis on opposite sides with respect to the longitudinal centerline plane of the chassis. A second pair of wheels is connected to the chassis, and wheels of the second pair of wheels can be moved with respect to the chassis between: a first position, in which they lie on opposite sides with respect to the longitudinal centerline plane of the chassis, and a second position, in which they lie substantially on the longitudinal centerline plane of the chassis.

19 Claims, 14 Drawing Sheets

MULTIFUNCTIONAL VEHICLE

CROSS-REFERENCE TO RELATED APPLICATIONS

This application is an U.S. national phase application under 35 U.S.C. § 371 based upon co-pending International Application No. PCT/EP2019/069135 filed on Jul. 16, 2019. Additionally, this U.S. national phase application claims the benefit of priority of co-pending International Application No. PCT/EP2019/069135 filed on Jul. 16, 2019 and Italian Application No. 102018000007362 filed on Jul. 20, 2018. The entire disclosures of the prior applications are incorporated herein by reference. The international application was published on Jan. 23, 2020 under Publication No. WO 2020/016236 A1.

BACKGROUND

Technical Field

The present invention relates to a multifunctional vehicle.

Background Description

In the background art, vehicles provided with an engine, a chassis and propulsion elements, such as wheels or tracks, are known.

A typical distinction of vehicles is linked to the number of propulsion elements that they have, for example two wheels for motorcycles and the like, three wheels for tricycles and trikes, four or more wheels for cars, vans, articulated trucks and the like.

Besides a mere distinction, however, the number of provided propulsion elements entails a different static and dynamic behavior of the vehicle: in fact (ignoring the action performed by the suspensions), both vehicles with three wheels and vehicles with four wheels (or more) can have a static balance that is instead absent in two-wheeled vehicles, which remain balanced mainly due to the gyroscopic effect of the moving wheels.

Focusing on three- or four-wheeled vehicles, the latter normally have a better road holding capability on bends and a better behavior in certain situations with respect to a three-wheeled vehicle; in the latter, furthermore, a fundamental role is played by the presence of the single wheel, if located at the rear or at the front.

However, for given operating situations, or even just for an leisure, it would be interesting to have available a vehicle that has improved functionality and is capable of approximating in each instance a three wheeled or four-wheeled vehicle.

Examples of this need are constituted by the recent development of vehicles such as three-wheeled motorcycles (with two front wheels) or so-called trikes (with two rear wheels).

Although rather interesting, these vehicles however are unable to be versatile enough for all requirements.

Another technical problem is related to the provision of vehicles that are alternative with respect to the solutions known in the background art. In the background art therefore there still is the need described above.

SUMMARY

The aim of the present invention is to provide a vehicle that solves the technical problem described above, obviates the drawbacks and overcomes the limitations of the background art, providing a vehicle that is versatile in use and can have the same advantages as three- and four-wheeled vehicles.

Within this aim, an object of the present invention is to provide a vehicle that is usable both for leisure and for work needs, such as a works vehicle.

Another object of the invention is to provide a vehicle that can be used for leisure, even without the need to carry people, such as for example a vehicle that constitutes a model or a toy.

A further object of the invention is to provide a vehicle that is capable of giving the greatest assurances of reliability and safety in use.

Another object of the invention is to provide a vehicle it is easy to provide and economically competitive if compared with the background art.

Another object of the invention is to provide a vehicle that is alternative to the ones known in the background art.

This aim, and these and other objects which will become better apparent hereinafter are achieved by a multifunctional vehicle, comprising—a chassis in which a longitudinal centerline plane is defined, a first pair of wheels connected to the chassis on opposite sides with respect to the longitudinal centerline plane of the chassis, a second pair of wheels connected to the chassis, wherein, according to the invention, the wheels of the second pair of wheels can be moved with respect to the chassis between:

a first position, in which they lie on opposite sides with respect to the longitudinal centerline plane of the chassis, a second position, in which they lie substantially on the longitudinal centerline plane of the chassis. In this manner it is possible to convert the vehicle according to the invention in two different configurations: a configuration in which it is substantially similar to a traditional four-wheeled vehicle (for example a car), with pairs of wheels arranged on opposite sides with respect to the centerline plane of the chassis, and a configuration in which the vehicle according to the invention is more similar to a three-wheeler, in which it has two wheels of the same pair arranged on opposite sides of the chassis and the two wheels of the second pair aligned along the centerline plane of said chassis.

BRIEF DESCRIPTION OF THE DRAWINGS

Further characteristics and advantages of the present invention will become better apparent from the description of a preferred but not exclusive embodiment of a vehicle, illustrated by way of nonlimiting example with the aid of the accompanying drawings, wherein.

DETAILED DESCRIPTION OF THE EMBODIMENTS

With reference to the figures, the vehicle, designated generally by the reference numeral 1, comprises a chassis 2, in which a longitudinal centerline plane X is defined, and a first pair of wheels 3, 4 which are connected to the chassis 2 on opposite sides with respect to the longitudinal centerline plane X.

Figure 1:
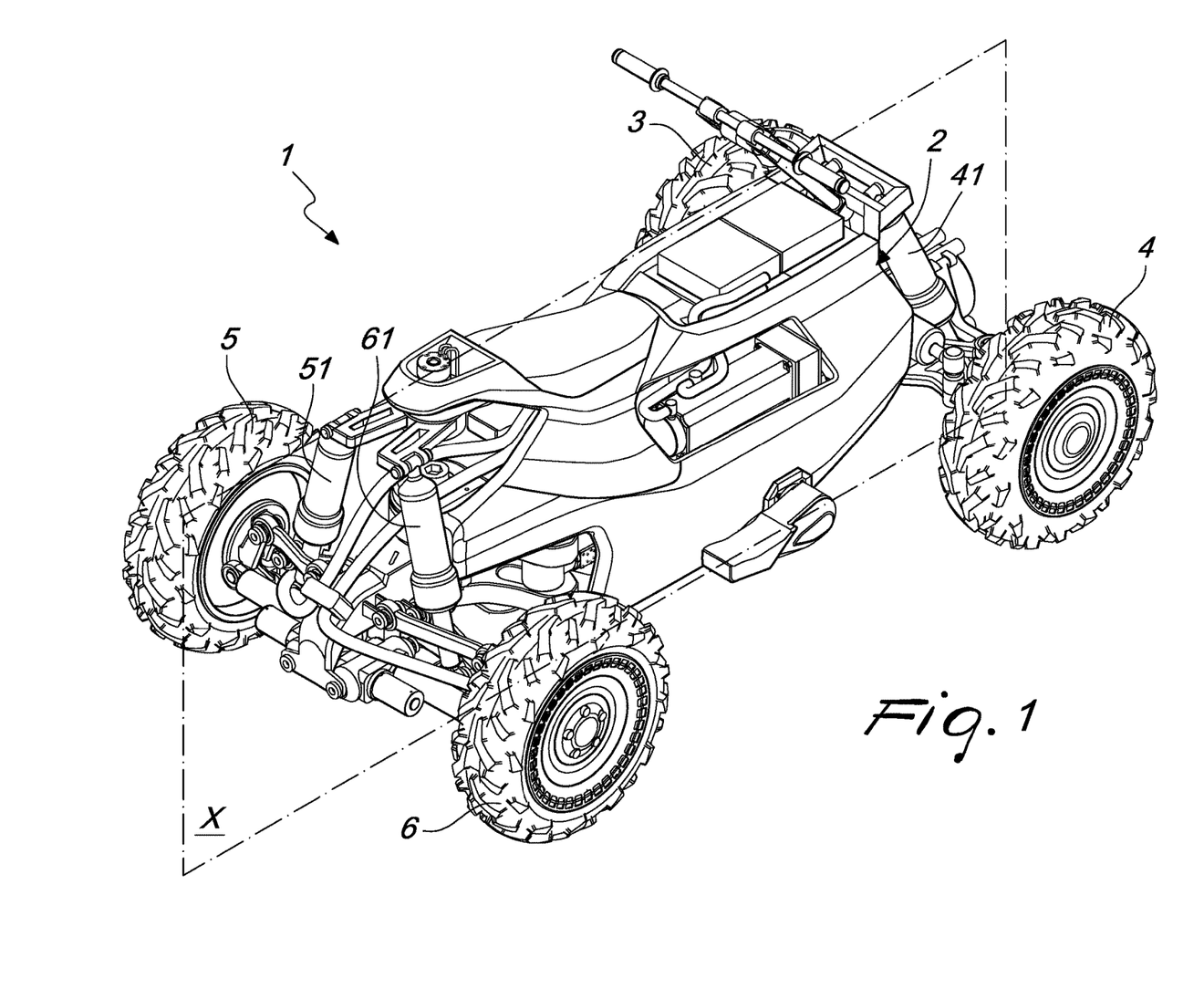
FIG. 1 is a perspective view, from the rear axle, of an embodiment of a vehicle according to the invention in a first operating configuration.
Figure 2:
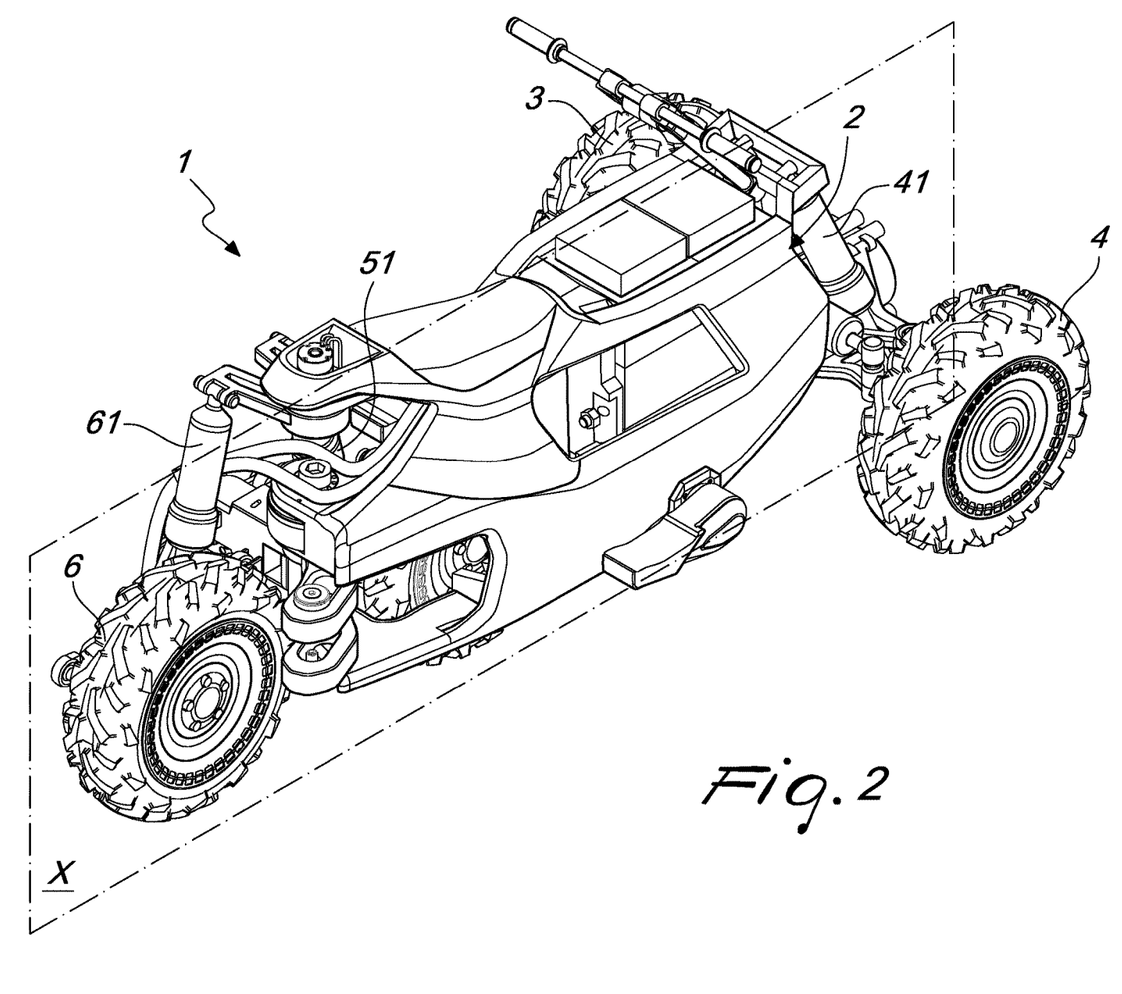
FIG. 2 is a perspective view, from the rear axle, of the vehicle of the preceding figure, in a second operating configuration.
Figure 3:
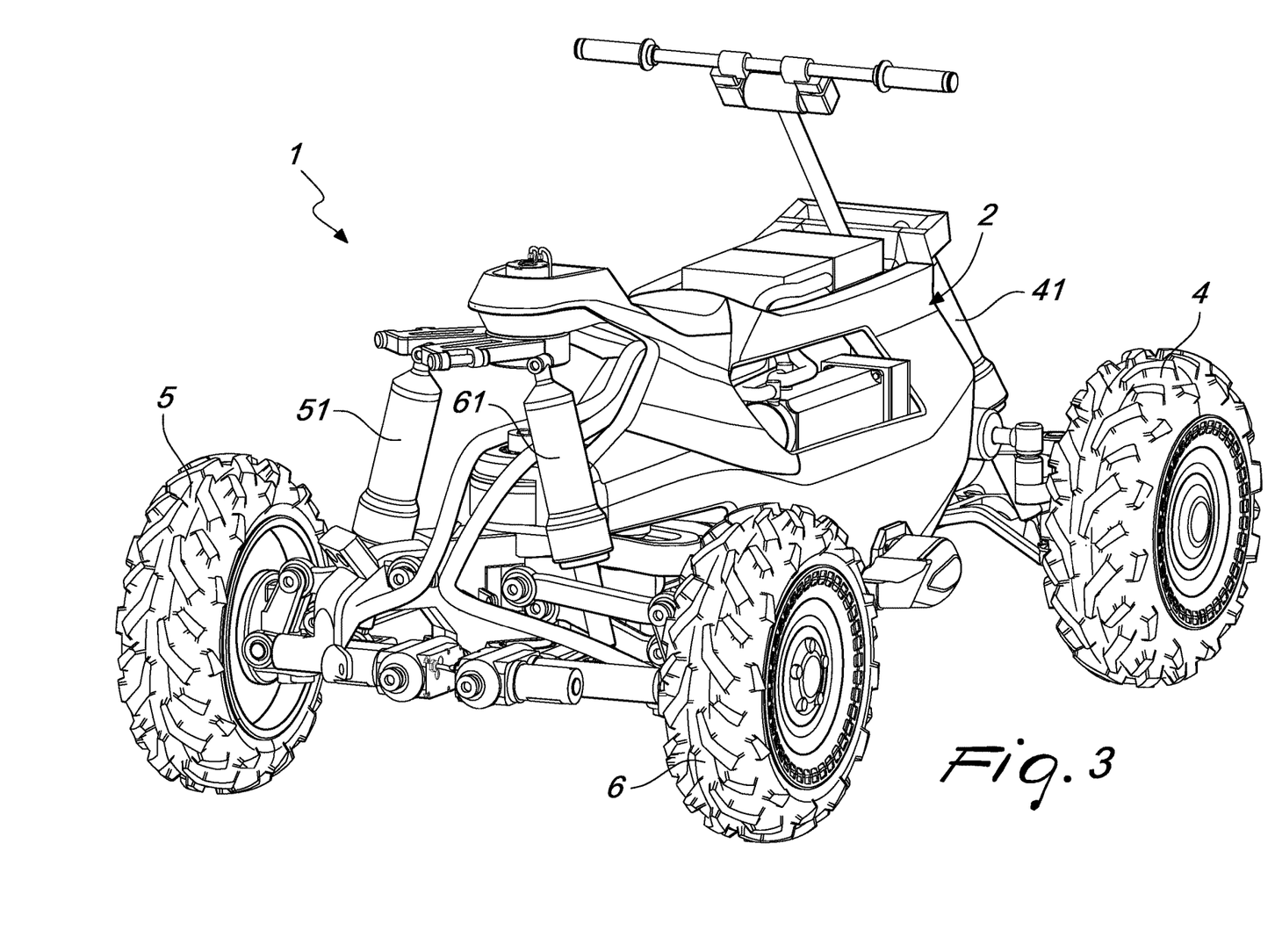
FIG. 3 is another perspective view from the rear axle of the vehicle of the preceding figures, in the first operating configuration, from a different angle.
Figure 4:
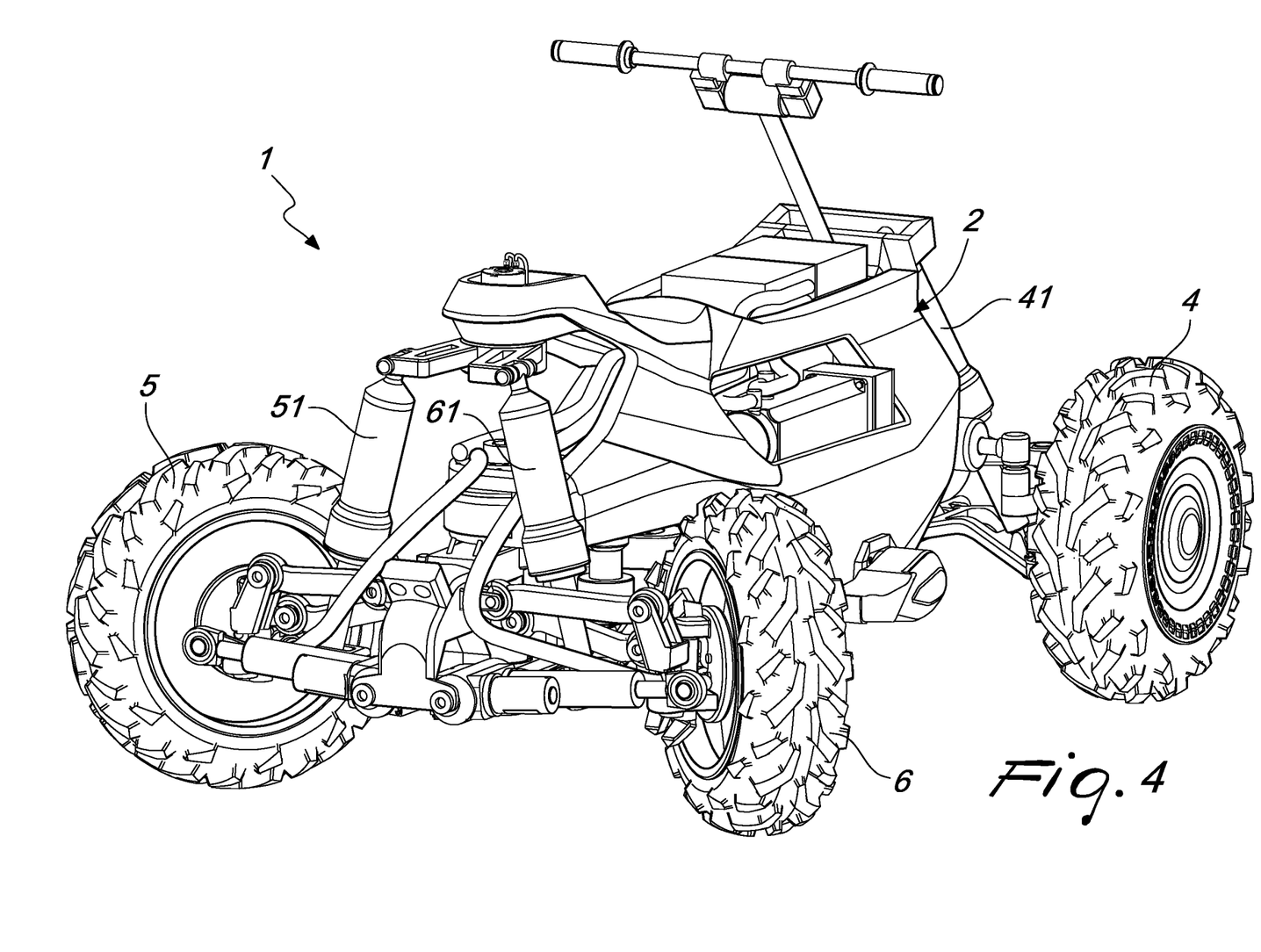
FIGS. 4 and 5 are perspective views from the rear axle of the vehicle of the preceding figures, in different moments of transition between the first and second operating configurations.
Figure 5:
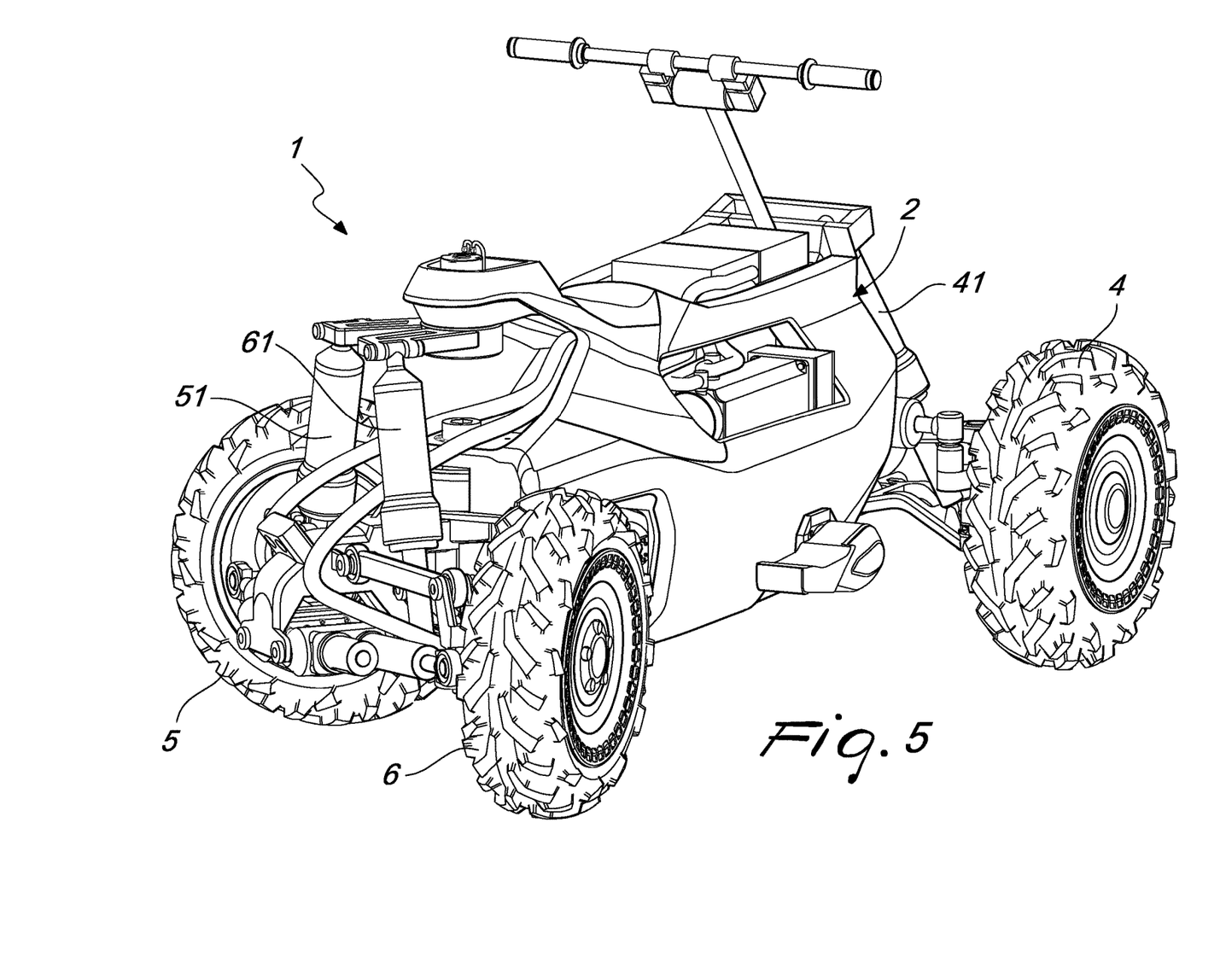

The vehicle 1 furthermore comprises a second pair of wheels 5, 6 which are connected to the chassis 2, said wheels 5, 6 of the second pair being movable with respect to the chassis 2 between:

a first position (FIG. 1 and FIG. 3), in which they lie on opposite sides with respect to the longitudinal centerline plane (X) of the chassis, a second position (FIG. 2 and FIG. 6), in which they lie substantially on the longitudinal centerline plane (X) of the chassis.

With reference to FIGS. 3-6, they show consecutive moments of the conversion of the vehicle 1 between the first and second configurations: as shown, the wheels 5, 6 of the second pair move with respect to the chassis 2, each following respective motion arcs which make them align with each other and along the plane X, therefore centrally with respect to the remaining wheels 3 and 4.

Details of the movement mechanism of the wheels 5 and 6 will be provided hereinafter.

Preferably, the first pair of wheels 3, 4 is a front pair of wheels, with reference to the forward travel of the vehicle 1.

Preferably, the second pair of wheels 5, 6 is a rear pair of wheels, with reference to the forward travel of the vehicle 1.

Figure 6:
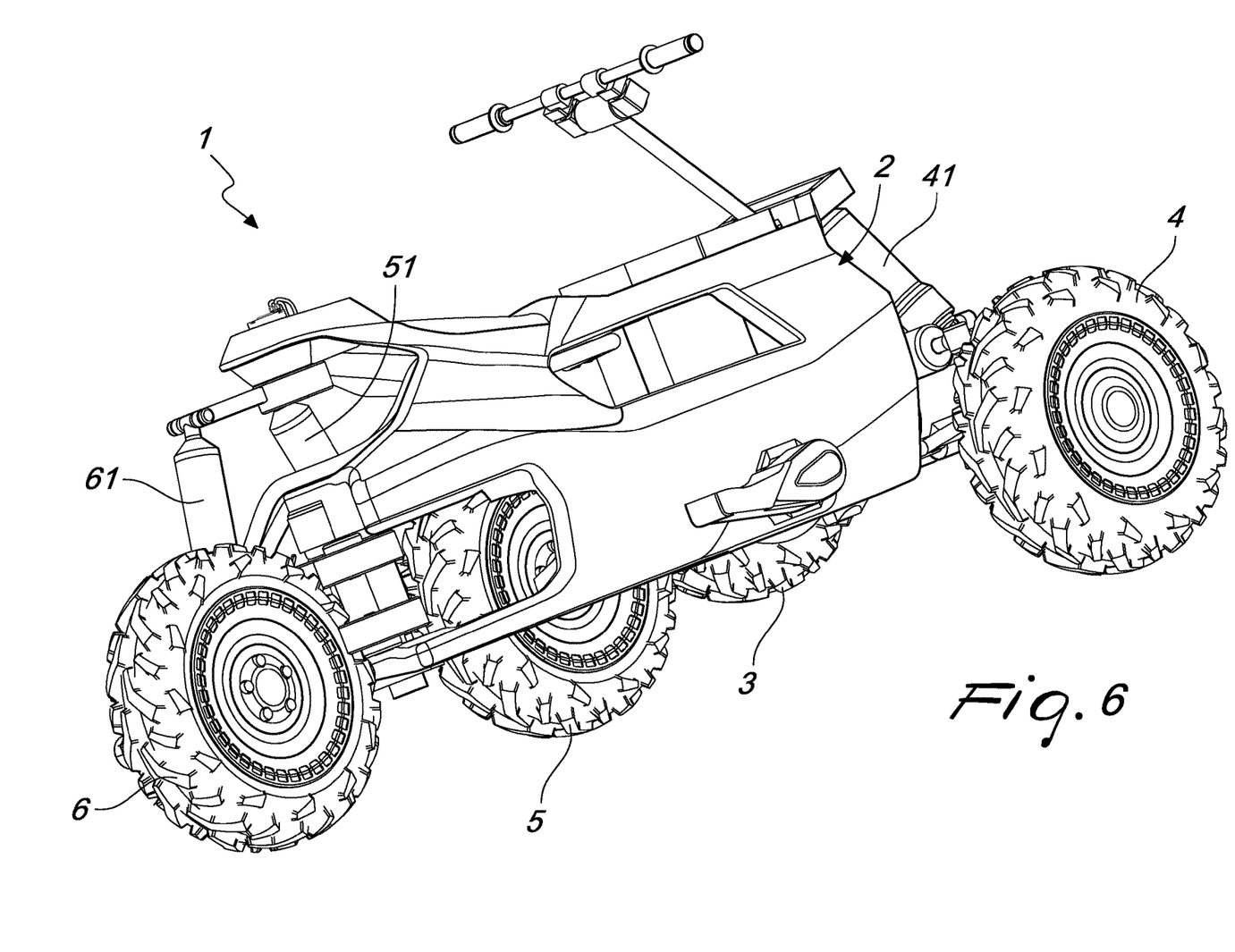
FIG. 6 is another perspective view from the rear axle of the vehicle of the preceding figures, in the second operating configuration, inclined with respect to a vertical plane.

Preferably, the wheels 3, 4 of the first pair are steerable wheels; more preferably, the wheels 3, 4 of the first pair are steerable and tilting wheels, as shown in FIG. 6.

Preferably, the wheels 3, 4 of the first pair and the wheels 5, 6 are connected to the chassis by means of shock-absorbing elements, respectively 31, 41, 51, 61.

Figure 8:
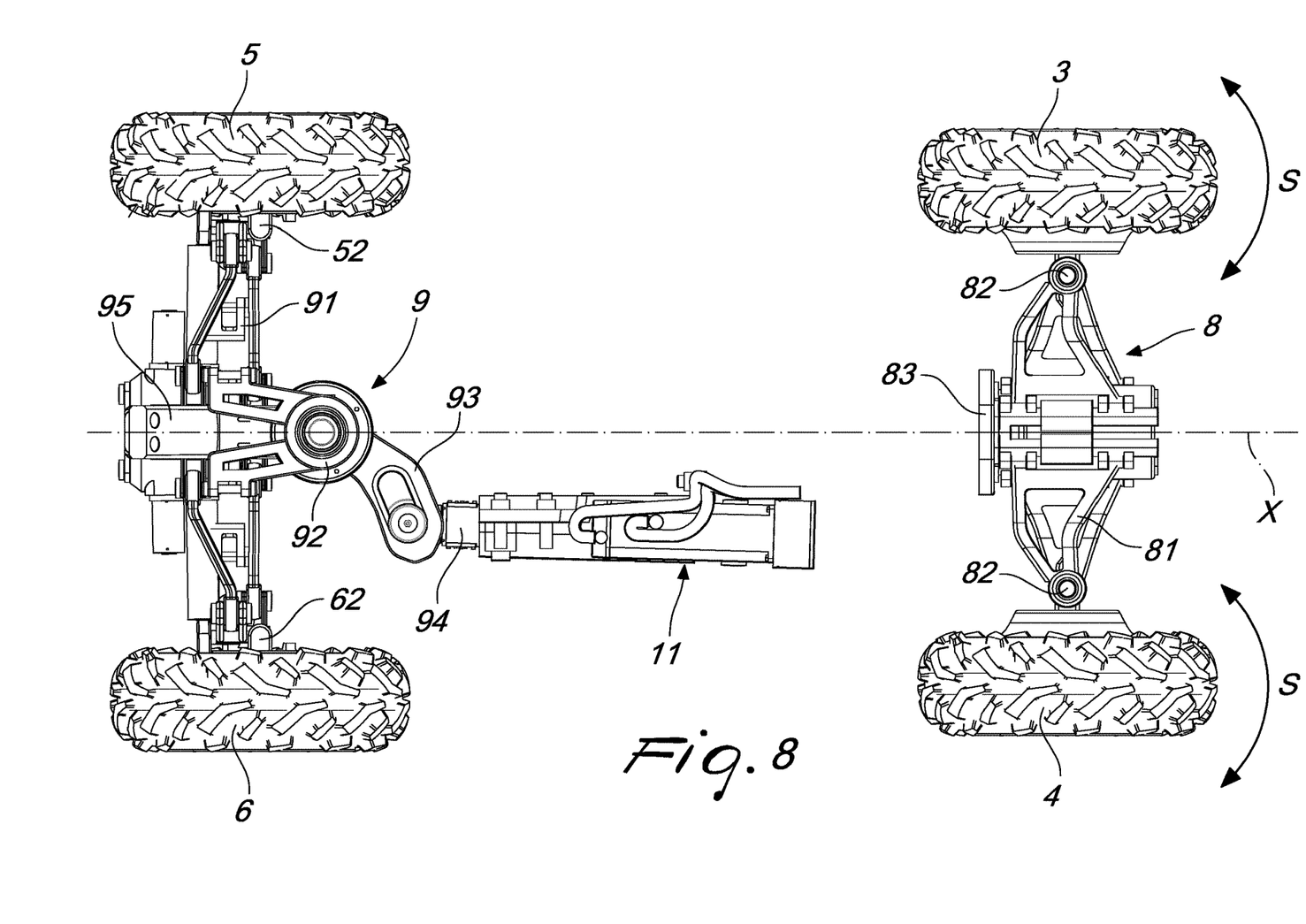
FIGS. 8 and 9 are top views of the wheel connecting assemblies of the vehicle of the preceding figures, in the first and second operating configurations respectively.
Figure 9:
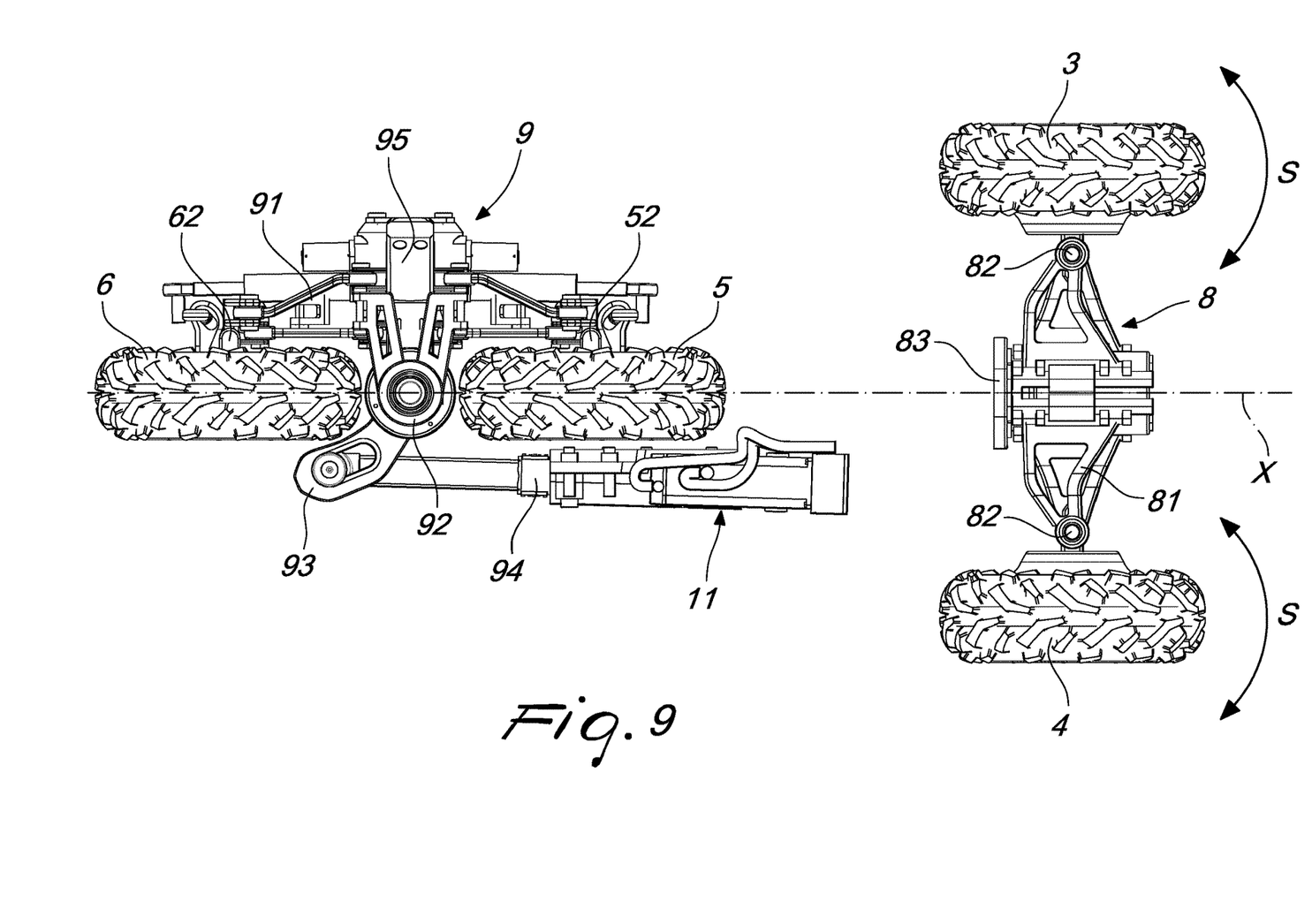
Figure 10:
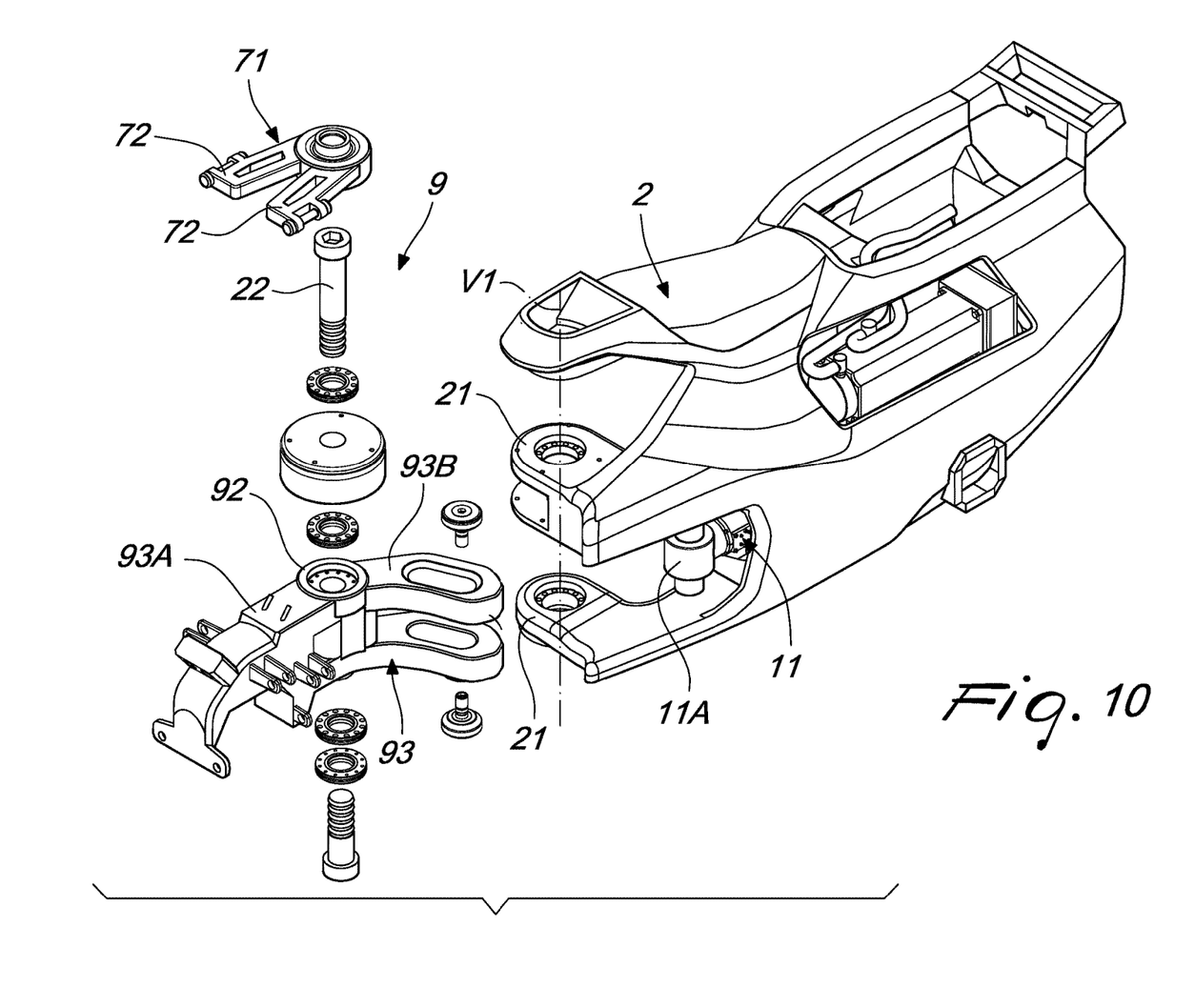
FIG. 10 is a partially exploded perspective view of a wheel connecting assembly and of part of the vehicle of the preceding figures.
Figure 11:
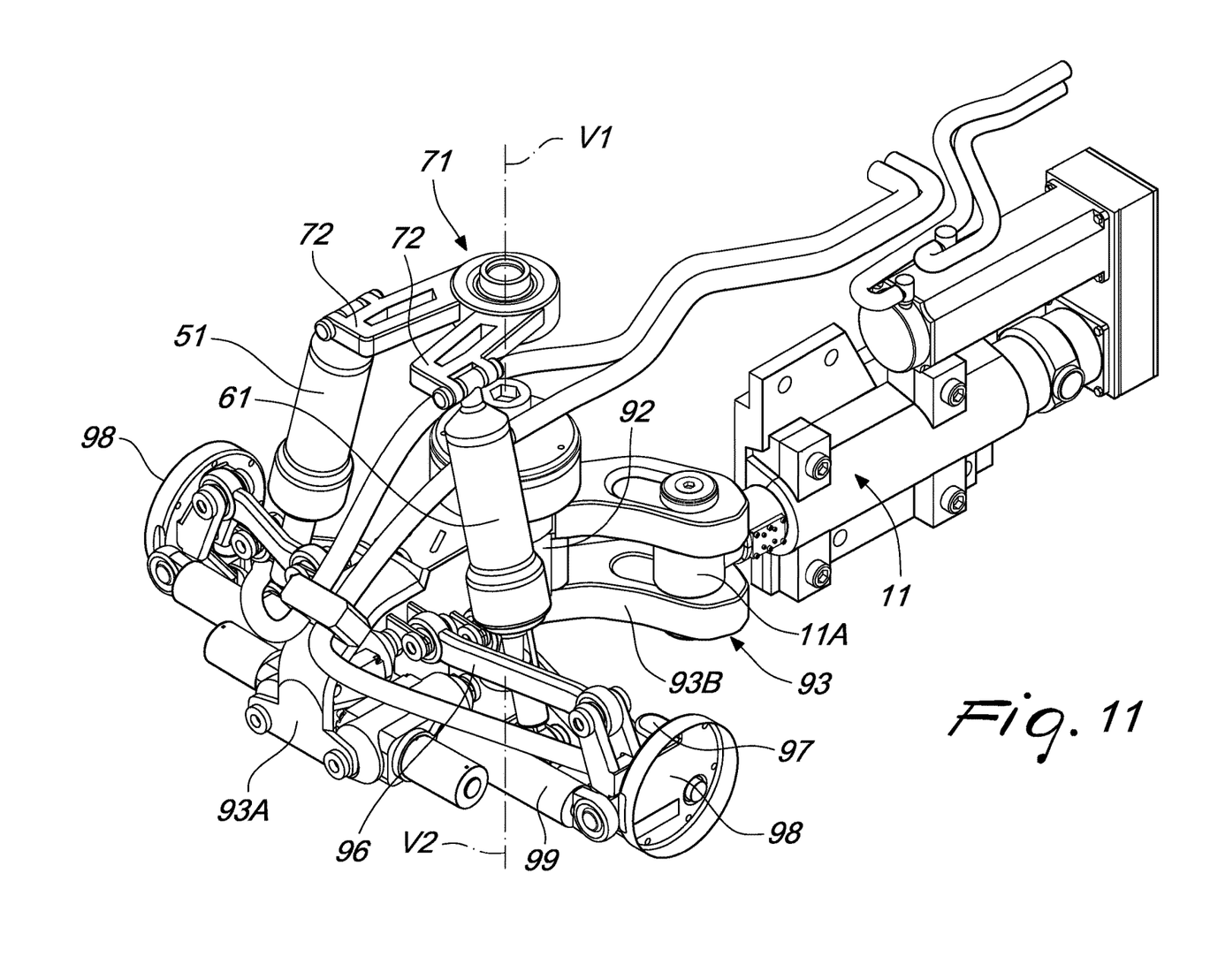
FIG. 11 is a perspective view of the wheel connecting assembly of the preceding figure.
Figure 12:
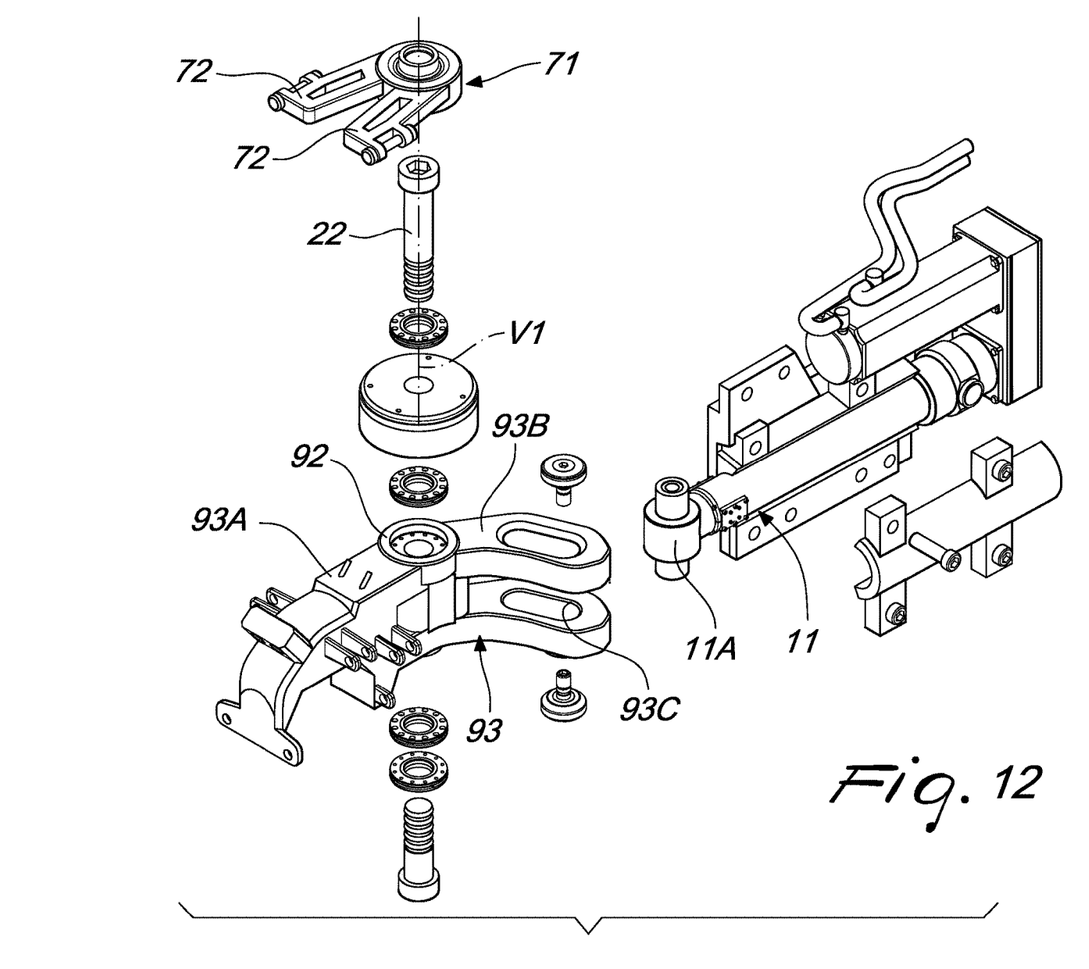
FIG. 12 is an exploded perspective view of part of the wheel connecting assembly of the preceding figure.

With reference now to FIGS. 8 and 9, they show the wheels 3, 4, 5, 6 and part of the respective assemblies 8 and 9 for connecting the first pair of wheels 3, 4 and of the second pair of wheels 5, 6 to the chassis.

In the example shown, the wheels of the first pair 3, 4 are steerable and tilting about a vertical plane (with reference to an operating condition of the vehicle): in other words, the wheels 3 and 4, in addition to steering, can be moved to different heights with respect to the chassis, so that during use (for example on a bend) the vehicle 1 can tilt with respect to the vertical and therefore assume the dynamic behavior that is typical of motorcycles, in which the inclination compensates the centrifugal force that is generated by traveling along a curved trajectory; in this operating configuration of the vehicle 1, the wheels 5 and 6 of the second pair are mutually aligned and are arranged on the centerline plane X (more precisely, the centerline plane X passes through the centerline plane of the wheels 5, 6): when the vehicle tilts laterally, the wheels of the first pair tilt, moving vertically with respect to the chassis (one upward, the other one downward) while the wheels of the second pair 5, 6 tilt with respect to the vertical plane, resting on the ground at the respective sides, just like the wheels of a motorcycle.

Figure 7:
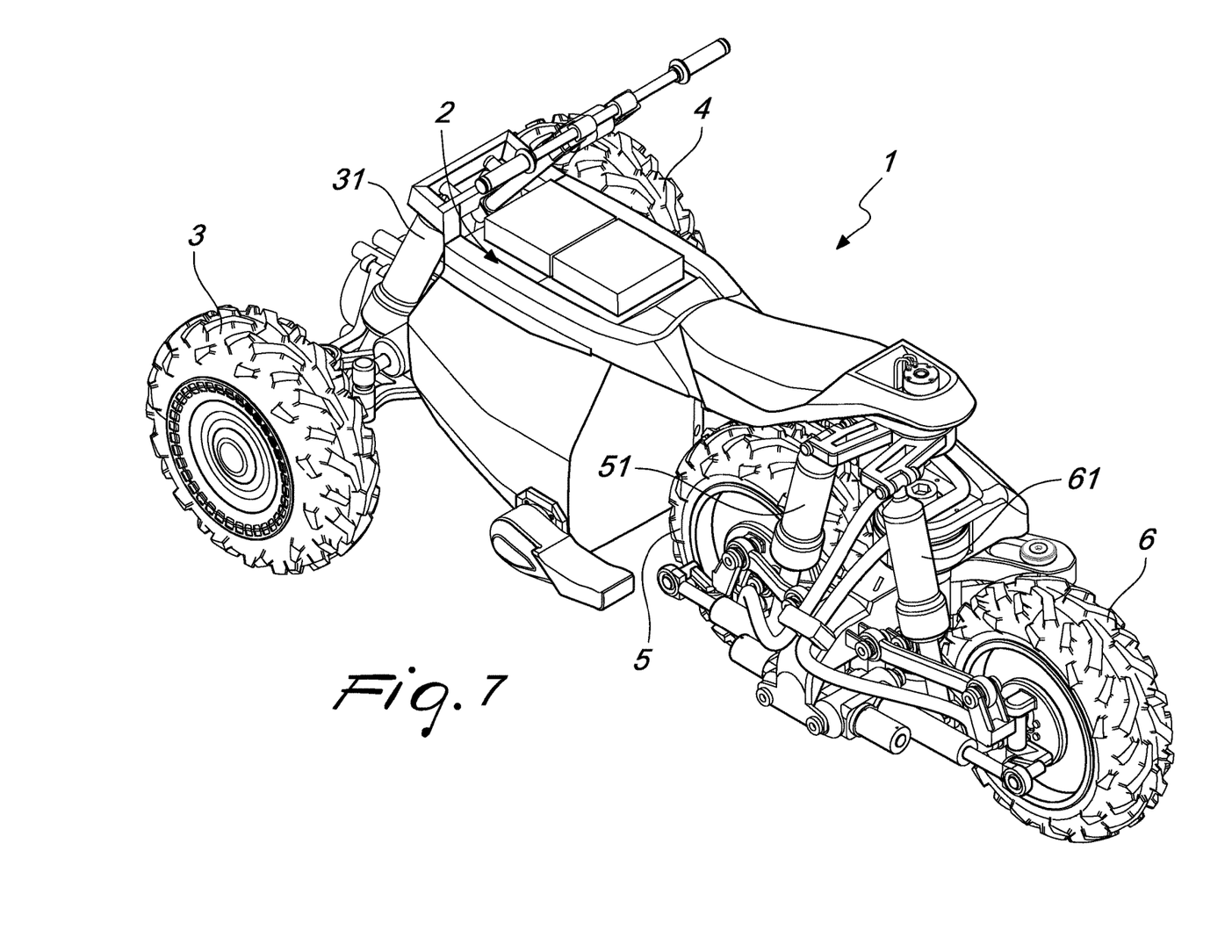
FIG. 7 is a top view of the vehicle of the preceding figures, in the second operating configuration on the opposite side with respect to the preceding figure.

The tilting behavior of the wheels of the first pair 3 and 4 can be obtained in various manners, by virtue of an appropriate provision of the corresponding assembly for connecting the wheels and the chassis: in some embodiments, the wheels 3 and 4 are individually connected to the chassis (optionally also by means of shock-absorbing elements), in other embodiments they are connected to the chassis 2 by means of a supporting structure shaped like an articulated quadrilateral or, as in the solution that is preferred and shown in FIGS. 7 and 8, the connecting assembly 8 comprises a common oscillating arm 81 for both wheels 3 and 4, to which said wheels are coupled, each with the interposition of a joint 82 which identifies a first rotoidal pair by means of which the wheels 3 and 4 are steerable, i.e., able to rotate along the arcs S, in order to produce the steering of the vehicle.

The oscillating arm 81 in turn is connected to the chassis 2 by means of a respective joint 83 (which likewise identifies a second rotoidal pair), by means of which the arm 81 oscillates about a horizontal plane (with respect to the operating condition of the vehicle) so as to produce the tilting of the wheels 3 and 4 with respect to the chassis 2 and thus allow one wheel to rise and the other one to lower (with respect to the chassis) by the same extent, as is evident from FIG. 9.

In this solution, therefore, the wheels 3 and 4 of the first pair are at the same time steerable and tilting by virtue of the fact that the respective first connecting assembly 8 comprises a total of three rotoidal pairs: two rotoidal pairs with mutually parallel axes (i.e., the vertical ones of the rotoidal pairs defined by the joints 82) and one rotoidal pair with an axis that is perpendicular to the other two (horizontal), i.e., the axis of the rotoidal pair defined by the joint 83.

If provided, the shock-absorbing elements 31 and 41 couple the oscillating arm 81 to the chassis 2, so as to dampen the oscillations imparted to the arm 81 by the wheels 3 and 4 during the movement of the vehicle 1 and determined (for example) by irregularities of the road surface or the like.

Moving on now to describe the second supporting assembly 9 of the wheels 5 and 6 of the second pair of wheels, it is different with respect to the first assembly 8 described above; it is in fact configured to allow the movement of the wheels 5 and 6 between the first configuration (FIG. 8) and the second configuration (FIG. 9).

As will become apparent hereinafter, generally the second supporting assembly 9 comprises one rotoidal pair for each wheel and a third rotoidal pair for both wheels 5, 6, all with mutually parallel axes, in particular vertical axes V1 and V2, in order to allow the rotation of the wheels about:

a vertical common rotation axis V1, in order to move the wheels 5, 6 between the first and second configurations and vice versa, a second vertical axis V2 for each wheel, so as to orient the wheels 5, 6 so that their rolling axis, in both configurations, is perpendicular to the plane X.

In particular in the nonlimiting example shown, the second supporting assembly 9 of the wheels 5 and 6 of the second pair (shown in greater detail also in FIGS. 10-13), comprises: a connecting assembly 91, designed to connect the wheels 5 and 6 and an actuation arm 93 provided with a rotation seat 92.

In particular, the actuation arm 93 comprises a first arm portion 93A which extends from the rotation seat 92 and is coupled to the connecting chassis 91 and the second arm portion 93B which extends from the rotation seat 92 and is coupled to an actuation end 11A of an actuator 11 (for example a hydraulic cylinder or the like), which in turn is integral with the chassis 2.

The first and second arm portions 93A, 93B configure a driving arm (93B) and a driven arm (93A) and are arranged preferably at different angles with respect to the center of rotation of the seat 92.

The seat 92 is coupled rotatably about the vertical axis V1 with the chassis 2.

The latter has, for this purpose, coupling seats 21 in which a pivot 22 is located which engages the seats 21 and the rotation seat 92, so as to form the first rotoidal pair of the assembly 9, by virtue of which the actuation arm 93 (moved by the actuation end 11A of the actuator 11) rotates about the vertical axis V1, which is preferably (and substantially) arranged on the centerline plane X of the chassis 2.

The rotation to which the arm 93 is subjected in the conversion between the first and second configurations is substantially equal to 90° (arc M of FIG. 13); in its rotation about V1, the arm 93 moves angularly the connecting assembly 91 that carries the wheel hubs 52, 62 of the wheels 5 and 6 from the first configuration to the second configuration: the wheel hubs 52, 62 in fact pass from being arranged at the sides of the plane X to being arranged in alignment on said plane X.

Figure 13:
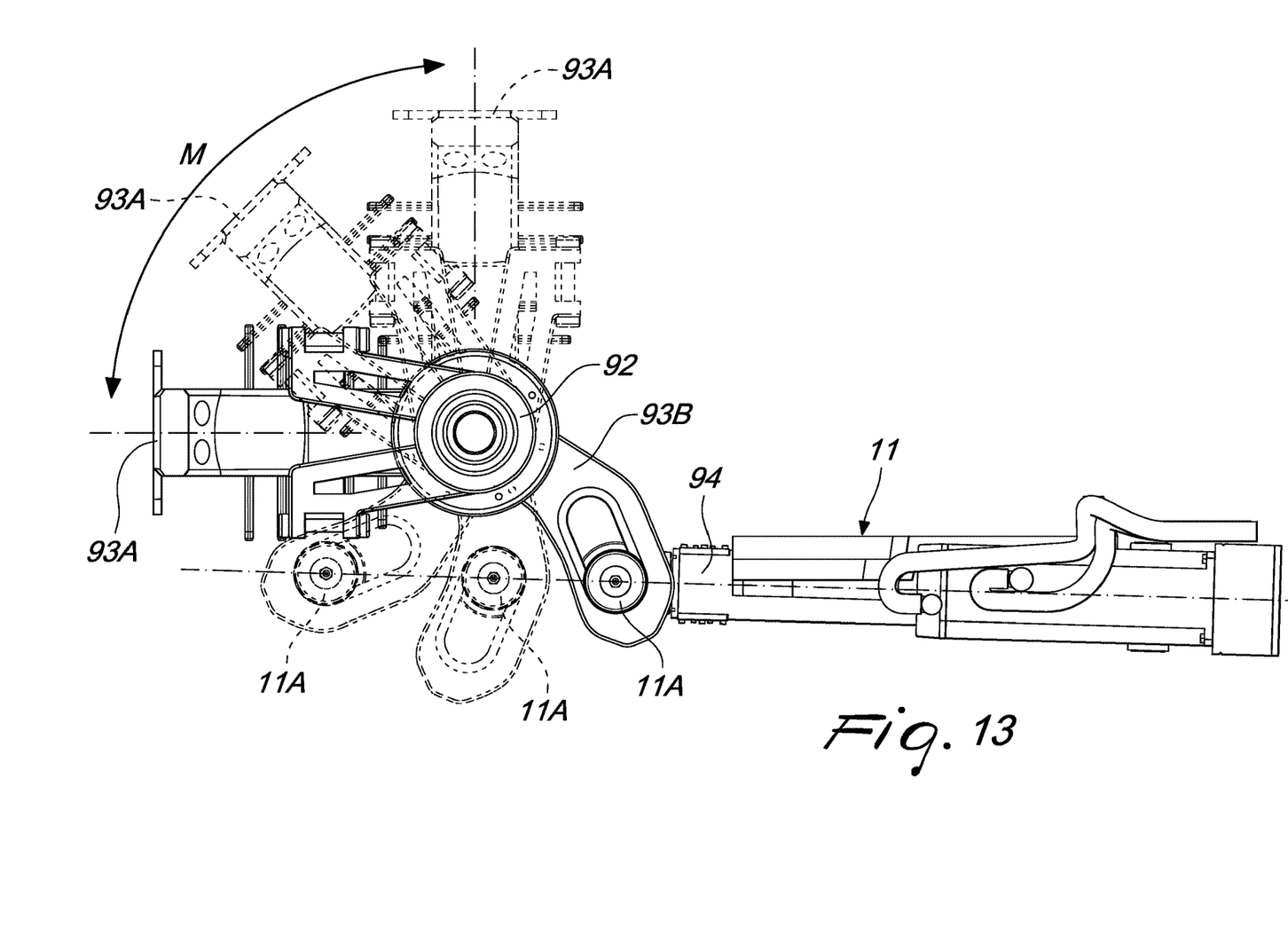
FIG. 13 is a top view of the various positions assumed by the wheel connecting assembly of the preceding figure, in the transition between the first and second configurations.

Preferably, the actuation end 11A of the actuator 11 is coupled to the second arm portion 93B (driving arm) by means of a slotted seat 93C that is provided on the latter and accommodates slidingly and rotatably the activation end 11A: in this manner, with reference to FIG. 13, the actuation end 11A during the movement of the arm 93 moves along a rectilinear trajectory and arranges itself within the slotted seat 93C, arranging itself in motion at different radii with respect to the center of rotation of the arm 93 and thus allowing a fluid motion along a movement arc M of 90° which corresponds to the movement of the arm 93 between the first configuration and the second configuration.

Figures 14, 15:
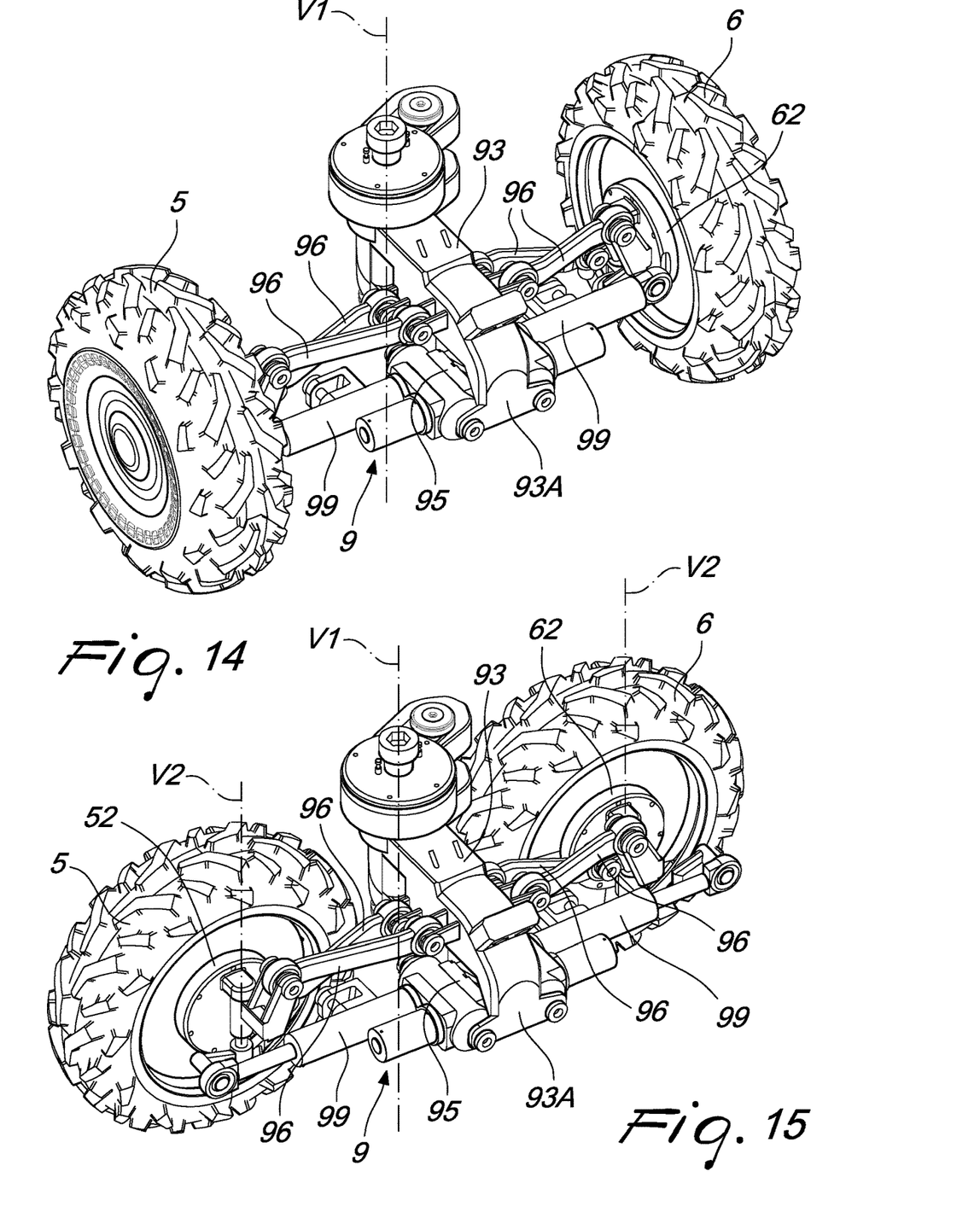
FIGS. 14 and 15 are perspective views of the wheel connecting assembly of the preceding figure, respectively in the first and second operating configurations.

Moving on now to describing the connecting assembly 91, it (Visible also in FIGS. 14, 15) comprises a central body 95 that is integral with the second arm portion 93B (actuated arm), for example coupled rigidly thereto with bolts or the like.

The connecting assembly 91 furthermore comprises, for each wheel 5, 6, a pair of reaction rods 96, which are connected to a respective support 98 of the wheel hub 52, 62 and to the central body 95.

In particular, each support 98 comprises two parts 98A and 98B: the part 98A is connected to the respective wheel hub 52, 62 and allows its rotation about the rotation axis of the respective wheel 5, 6, while the second part 98B is coupled to the reaction rods 96; between the first part 98A and the second part 98B of each support 98, the latter has a hinge 98C with a vertical axis V2, which in this example forms the second rotoidal pair of the assembly 9.

Each reaction rod 96 is articulated with the central body 95 and with the second part 98B of the respective support 98 so as allow an up/down movement of the respective support 98 (required in order to have a dampening functionality).

By virtue of the hinge 98C, the first part 98A of the wheel hub can rotate through approximately 90° with respect to the second part 98B, ultimately allowing to orient the wheels 5, 6 so that they have a rolling axis that is perpendicular to the axis of the plane X when the vehicle is in the second configuration.

In particular, in the example shown in the accompanying figures, the wheels 5, 6 rotate about the respective axes V2 discordantly, thus arranging themselves both on the same side of the central body 95.

From what has just been described it is evident that the wheel hubs 52, 62 pass from the first configuration to the second configuration by means of a double rotation: a first rotation about the axis V1, which makes them move from the sides of the plane X until they lie substantially on said plane X, and a second rotation, the one performed with the support 98 about the axis V2, which makes the hubs 52, 62 arrange themselves with the respective rolling axis of the wheel perpendicular to the plane X and therefore, ultimately, until the wheels 5 and 6 are aligned, one behind and the other in front, on the plane X.

In order to actuate the second rotation, about the axis V2, the connecting assembly 91 comprises for each support 98 an actuator 99, for example a hydraulic one, which is connected to the central body 95 and to the first part of the support 98 A, in order to rotate it about the vertical axis V2.

Moving on now to describing the shock-absorbing elements 51 and 61, they must move preferably together with the connecting assembly 91 so as to follow the wheels 5, 6 in their movement between the first and second configurations.

For this purpose, the shock-absorbing elements 51, 61 are connected in a downward region to the connecting assembly 91, preferably each shock-absorbing element 51, 61 to an actuator 99 and, in an upward region, to a rotatable support 71 that is coaxial with the axis V1.

The rotatable support 71 preferably has two engagement extensions 72, one for each shock-absorbing element 51, 61, and is rotationally actuated so as to follow the rotation of the arm 93 and thus move the upper coupling points of the shock-absorbing elements 51, 61 so as to match the lower coupling points, thus following the movement of the wheels 5, 6 in order to allow the shock-absorbing elements 51, 61 to perform their action equally in both configurations.

Preferably, the rotatable support 71 is motorized, so as to assist the actuator 11 during the movement of the wheels 5, 6 between the first configuration and the second configuration and vice versa; the motor drive, in a broad sense, can be obtained in various manners, for example by means of an electric motor or more preferably by means of a hydraulic actuator which can be controlled synchronously with the actuator 11 described above.

As regards instead the motor means of the vehicle 1, designed to move it during travel, they can be of various kinds.

The preferred and illustrated solution provides that a hydraulic motor is installed inside each hub of the wheels 3, 4, 5, 6 and is appropriately controlled by dedicated supply and discharge lines of an actuation liquid (for example hydraulic oil), which is fed to them by a pump installed on board the vehicle (not shown): in this matter, traction on all the wheels is achieved which makes the vehicle particularly functional if it has to move in conditions of poor grip.

A fundamentally equivalent variation provides for the vehicle to have an electric drive and for electric motors powered by a battery pack on board the vehicle to be installed in the wheels 3, 4, 5, 6.

Of course, according to more simple variations, it is conceivable to provide only some pairs of wheels (for example the wheels 3 and 4 or 5 and 6) with hydraulic or electric motor means; in a particularly simple variation (suitable for example when the vehicle 1 is a model or a toy), it is possible to conceive having a single motor means in a single wheel, for example the wheel 6 or the wheel 5.

As regards the chassis 2, it is preferably made of carbon fiber, but it might be made equivalently also of other materials.

The operation of the vehicle is clear and evident from what has been described.

In practice it has been found that the vehicle according to the present invention achieves the intended aim and objects, since it allows to have available a vehicle that is versatile in use and can have the same advantages as three- and four-wheeled vehicles.

Another advantage of the vehicle according to the invention is that it can be used both for leisure and for work needs, such as a works vehicle.

Another advantage of the vehicle according to the invention is that it can be used for leisure, even without the need to carry people, such as for example a vehicle that constitutes a model or a toy. Another advantage of the vehicle according to the invention is that is provides a vehicle that is alternative to the ones known by the background art.

The vehicle thus conceived is susceptible of numerous modifications and variations, all of which are within the scope of the appended claims.

All the details may furthermore be replaced with other technically equivalent elements.

In practice, the materials used, so long as they are compatible with the specific use, as well as the contingent shapes and dimensions, may be any according to the requirements.

The disclosures in Italian Patent Application No. 102018000007362 from which this application claims priority are incorporated herein by reference.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

The invention claimed is:

1. A multifunctional vehicle, comprising:
    a chassis in which a longitudinal centerline plane is defined;
    a first pair of wheels connected to the chassis on opposite sides with respect to the longitudinal centerline plane of the chassis, the first pair of wheels being steerable and tiltable;
    a second pair of wheels connected to the chassis, the second pair of wheels being moveable with respect to the chassis between:
        a first position, in which the second pair of wheels lie on opposite sides with respect to the longitudinal centerline plane of the chassis; and
        a second position, in which the second pair of wheels lie substantially on the longitudinal centerline plane of the chassis;
    a first connecting assembly for connecting the first pair of wheels to the chassis, the first connecting assembly comprising at least two rotoidal pairs: a first rotoidal pair for each wheel of the first pair of wheels and a second rotoidal pair with an axis that is perpendicular to the first rotoidal pair between the connecting assembly and the chassis;
    a second supporting assembly for supporting the second pair of wheels, the second supporting assembly comprising a rotoidal pair for each wheel of the second pair of wheels and a third rotoidal pair for both of the wheels of the second pair of wheels, wherein the rotoidal pair for each wheel of the second pair of wheels and the third rotoidal pair each having respective axes which are mutually parallel in order to allow rotation of the wheels of the second pair of wheels about:
    a first common rotation axis, in order to move the wheels of the second pair of wheels between a first configuration and a second configuration and vice versa; and
    a second axis for each of the wheels of the second pair of wheels, so as to orient the second pair of wheels so that a rolling axis thereof, in the first and second configurations, is perpendicular to the centerline plane of the chassis.

2. The vehicle according to claim 1, wherein the first pair of wheels is a front pair of wheels and the second pair of wheels is a rear pair of wheels, with reference to a forward travel of the vehicle.

3. The vehicle according to claim 1, wherein the first connecting assembly comprises an arm coupled in an oscillating manner to the chassis by means of a third rotoidal pair and to the first pair of wheels by means of the first rotoidal pair, one for each wheel of the first pair of wheels.

4. The vehicle according to claim 3, the vehicle further comprising shock-absorbing elements that couple the oscillating arm to the chassis, the shock-absorbing elements being configured to dampen oscillations imparted to the oscillating arm by the first pair of wheels.

5. The vehicle according to claim 1, wherein the second connecting assembly comprises an assembly for connecting the second pair of wheels that is functionally connected to an actuation arm, the actuation arm being provided with at least one rotation seat that is rotationally coupled to the chassis, the rotation seat defining the third rotoidal pair in order to allow rotation of the actuation arm at the first common rotation axis.

6. The vehicle according to claim 5, wherein the vehicle being furthermore provided with at least with one actuator configured to impart a rotation to the actuation arm.

7. The vehicle according to claim 5, wherein the second connecting assembly comprises, for each of the wheels of the second pair of wheels, an actuator configured to rotate the wheels of the second pair of wheels, respectively.

8. The vehicle according to one or more of claim 5, wherein the second connecting assembly further comprises a shock-absorbing element for each of the wheels of the second pair of wheels, the shock-absorbing element each being configured to move together with the second connecting assembly in a rotation about the first common rotation axis formed by the third rotoidal pair.

9. The vehicle according to claim 1, wherein the vehicle further comprises a motor that acts directly on at least one of the wheels of the first pair of wheels or the second pair of wheels.

10. A multifunctional vehicle, comprising:
a chassis in which a longitudinal centerline plane is defined;
a first pair of wheels connected to the chassis on opposite sides with respect to the longitudinal centerline plane of the chassis, the first pair of wheels being steerable and tiltable;
a second pair of wheels connected to the chassis, the second pair of wheels being moveable with respect to the chassis between:
a first position, in which the second pair of wheels lie on opposite sides with respect to the longitudinal centerline plane of the chassis; and
a second position, in which the second pair of wheels lie substantially on the longitudinal centerline plane of the chassis; and
a second supporting assembly for supporting the second pair of wheels, the second supporting assembly comprising a rotoidal pair for each wheel of the second pair of wheels and a third rotoidal pair for both of the wheels of the second pair of wheels, wherein the rotoidal pair for each wheel of the second pair of wheels and the third rotoidal pair each having respective axes which are mutually parallel in order to allow rotation of the wheels of the second pair of wheels about:
a first common rotation axis, in order to move the wheels of the second pair of wheels between a first configuration and a second configuration and vice versa; and
a second axis for each of the wheels of the second pair of wheels, so as to orient the second pair of wheels so that a rolling axis thereof, in the first and second configurations, is perpendicular to the centerline plane of the chassis.

11. The vehicle according to claim 10, wherein the first pair of wheels is a front pair of wheels and the second pair of wheels is a rear pair of wheels, with reference to a forward travel of the vehicle.

12. The vehicle according to claim 10, wherein the vehicle further comprising a first connecting assembly for connecting the first pair of wheels to the chassis, the first connecting assembly comprising at least two rotoidal pairs: a first rotoidal pair for each wheel of the first pair of wheels and a second rotoidal pair with an axis that is perpendicular to the first rotoidal pair between the connecting assembly and the chassis.

13. The vehicle according to claim 12, wherein the first connecting assembly comprises an arm coupled in an oscillating manner to the chassis by means of a third rotoidal pair and to the first pair of wheels by means of the first rotoidal pair, one for each wheel of the first pair of wheels.

14. The vehicle according to claim 13, the vehicle further comprising shock-absorbing elements that couple the oscillating arm to the chassis, the shock-absorbing elements being configured to dampen oscillations imparted to the oscillating arm by the first pair of wheels.

15. The vehicle according to claim 10, wherein the second connecting assembly comprises an assembly for connecting the second pair of wheels that is functionally connected to an actuation arm, the actuation arm being provided with at least one rotation seat that is rotationally coupled to the chassis, the rotation seat defining the third rotoidal pair in order to allow rotation of the actuation arm at the first common rotation axis.

16. The vehicle according to claim 15, wherein the vehicle being furthermore provided with at least with one actuator configured to impart a rotation to the actuation arm.

17. The vehicle according to claim 10, wherein the second connecting assembly comprises, for each of the wheels of the second pair of wheels, an actuator configured to rotate the wheels of the second pair of wheels, respectively.

18. The vehicle according to one or more of claim 10, wherein the second connecting assembly further comprises a shock-absorbing element for each of the wheels of the second pair of wheels, the shock-absorbing element each being configured to move together with the second connecting assembly in a rotation about the first common rotation axis formed by the third rotoidal pair.

19. The vehicle according to claim 10, wherein the vehicle further comprises a motor that acts directly on at least one of the wheels of the first pair of wheels or the second pair of wheels.

* * * * *